United States Patent [19]
Saito et al.

[11] Patent Number: 5,534,338
[45] Date of Patent: Jul. 9, 1996

[54] HEAT RESISTANT CLOTH FOR FIRE FIGHTING COMPRISING IN ORDER: A FABRIC SUBSTRATE, A RUBBER LAYER, A METAL COATED POLYESTER FILM LAYER AND A TETRAFLUOROETHYLENE COPOLYMER FILM LAYER

[75] Inventors: Masami Saito; Akio Mogami; Yoshihisa Kanasasi, all of Mishima; Torataro Kobayashi, Tokyo, all of Japan

[73] Assignees: Toyo Metallizing Kabushiki Kaisha; Kobayashi Bokafuku Kabushiki Kaisha, both of Tokyo, Japan

[21] Appl. No.: 359,022

[22] Filed: Dec. 19, 1994

[30] Foreign Application Priority Data

Dec. 22, 1993 [JP] Japan .................................. 5-068545 U

[51] Int. Cl.⁶ .................. B32B 5/16; B32B 7/00; B32B 15/00; B27N 9/00
[52] U.S. Cl. .................. 428/242; 428/250; 428/263; 428/285; 428/265; 428/920; 428/921
[58] Field of Search ...................... 428/920, 921, 428/250, 252, 265, 285, 242, 263

[56] References Cited

U.S. PATENT DOCUMENTS

| 4,515,761 | 5/1985 | Plotzker | 423/240 |
| 4,731,283 | 3/1988 | Sakane et al. | 428/251 |

FOREIGN PATENT DOCUMENTS 62-34765  9/1987  Japan .

*Primary Examiner*—James D. Withers
*Attorney, Agent, or Firm*—Ladas & Parry

[57] ABSTRACT

A heat resistant cloth for fire fighting comprises a rubber layer, a bonding layer containing a flame retardant, a polyester film with a metallic (e.g. aluminum) film deposited on both sides thereof, a bonding layer containing flame retardant, and a tetrafluoroethylene copolymer film which are layered and bonded together on a substrate fabric. The flame retardant contained in the bonding layers provides excellent flame resistance.

5 Claims, 1 Drawing Sheet

HEAT RESISTANT CLOTH FOR FIRE FIGHTING COMPRISING IN ORDER: A FABRIC SUBSTRATE, A RUBBER LAYER, A METAL COATED POLYESTER FILM LAYER AND A TETRAFLUOROETHYLENE COPOLYMER FILM LAYER

BACKGROUND OF THE INVENTION

1. Field of the Invention

The present invention relates to heat resistant cloth used primarily for firemen's clothing.

2. Description of the Related Art

Conventional heat resistant cloth for firemen's clothing worn by firemen at the site of fire is disclosed in Japanese Utility Model Registration Publication No. 62-34765.

The heat resistant cloth for fire fighting comprises a synthetic rubber layer, a polyester film having aluminum films deposited on opposite sides thereof and having a reflective function, and a tetrafluoroethylene copolymer film serving as a protective layer which are layered and bonded together on the outside of a woven fabric, thereby providing high fire resistance, heat resistance, heat reflectivity, heat insulation, waterproofness, chemical resistance and impact resistance. Also, the heat resistant cloth is light in weight, flexible, and excellent in safety, while providing good weather resistance, resistance to softening and abrasion resistance, high tensile strength and tearing strength, easy maintenance, a comfortable texture, and resistant to soiling.

However, since the conventional heat resistant cloth for fire fighting uses an acrylic-base bonding agent to bond a metallic (such as aluminum) film deposited on both sides of the polyester film, the synthetic rubber layer and the tetrafluoroethylene copolymer film together, there is a fear that the bonding agent deteriorates or burns due to heat when used at high temperatures. Accordingly, a problem of the separation of the rubber layer or copolymer film from the metallic film and of deterioration in durability exists.

SUMMARY OF THE INVENTION

In view of the foregoing, it is an object of the present invention to provide, without deteriorating the physical properties or texture, heat resistant cloth for fire fighting which is free from the separation of a rubber layer or a tetrafluoroethylene copolymer film serving as a protective layer from a metallic film formed on both sides of a polyester film and having a reflective function even after being used for long hours at high temperatures and which has improved durability.

The heat resistant cloth for fire fighting according to the present invention comprises a rubber layer, a first bonding layer containing a flame retardant, a polyester film having metal deposited on opposite sides thereof, a second bonding layer containing a flame retardant, and a tetrafluoroethylene copolymer film, which are layered and bonded together on the outside of a substrate fabric.

Since the bonding layer containing a flame retardant is used to bond the rubber layer and the metallic film deposited on the inside of the polyester film together and the metallic film deposited on the outside of the polyester film and the tetrafluoroethylene copolymer film together, firemen's clothing made of the heat resistance cloth according to the present invention is less likely to suffer thermal deterioration of both bonding layers and to burn even after being used for long hours at high temperatures.

In contrast to the conventional heat resistant cloth for fire fighting, because of the addition of a flame retardant to the bonding layer, the heat resistant cloth for fire fighting according to the present invention has excellent flame resistance. Also, even when the bonding layer burns, it is possible to reduce afterflame, afterglow and the length of char, thereby improving safety. Moreover, the addition of a flame retardant produces hardly any increase in weight and does not cause deterioration in physical properties or texture.

BRIEF DESCRIPTION OF THE DRAWING

Various other objects, features and many of the attendant advantages of the present invention will be readily appreciated as the same becomes better understood by reference to the following detailed description of the preferred embodiment when considered in connection with the accompanying drawing, in which.

DESCRIPTION OF THE PREFERRED EMBODIMENT

Figure 1:
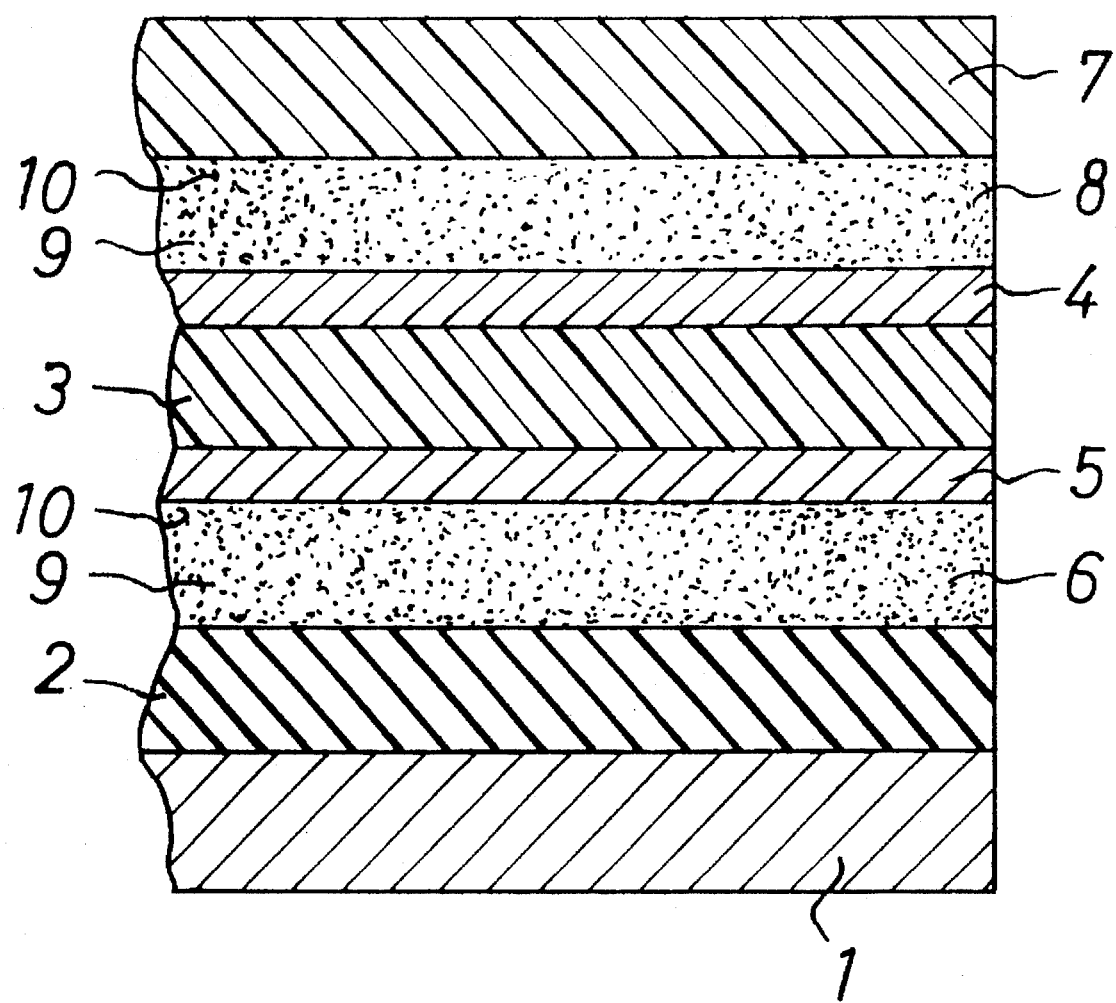
FIG. 1 is an enlarged partial cross-section of heat resistant cloth for fire fighting according to an embodiment of the present invention.

An embodiment of the present invention will now be described with reference to the drawing.

In FIG. 1, reference numeral 1 denotes a substrate fabric made of a woven cloth of cotton, polyester, vinylon, aramid fibers, or Novoloid mixed yarn. The substrate fabric 1 is preferably of a woven cloth of aramid fibers having good heat resistance and high mechanical strength. A synthetic rubber layer 2 of heat resistant Hypalon rubber or neoprene rubber is bonded to the surface of the substrate fabric 1. To prevent the separation of a polyester film 3 caused by water permeating through the substrate fabric 1 from the inside thereof, the rubber layer 2 is inseparably bonded to the substrate fabric 1 by applying a liquid vulcanizing agent to the substrate fabric 1 and having liquid rubber of the rubber layer 2 permeating through the portion bonded to the substrate fabric 1.

Reflective metallic films 4 and 5 of aluminum or the like are formed on opposite sides of the polyester film 3 by vapor deposition to form a reflecting plate. For a more comfortable texture, it is preferable that the polyester film 3 be 4–25 μm thick and that highly pure aluminum particulates be vapor deposited on both sides of the film 3 to form the metallic films 4 and 5.

The inner metallic film 5 on the polyester film 3 is bonded to the surface of the rubber layer 2 by an inner bonding layer 6 containing a flame retardant, to be described later, and a tetrafluoroethylene copolymer film 7 forming a protective layer is bonded to the outer metallic film 4 on the polyester film 3 by an outer bonding layer 8 containing a flame retardant.

The inner and outer bonding layers 6 and 8 containing a flame retardant are a thermosetting or thermoplastic resin of an acrylic-base, urethane-base, polyester-base, or ethylene vinyl acetate-base, or a copolymer thereof. Moreover, in the bonding layers 6 and 8, an additive flame retardant 10 is added to a synthetic rubber-base bonding agent 9. It is preferable that the additive flame retardant 10 be a powder of aluminum hydroxide, antimony oxide, bromic compound, chromium compound, or phosphoric compound and be added to the resin-base bonding agent 9 in an amount of 5–20% by weight. The flame retardant may be a reactive epoxy compound, polycarbonate-base compound, polyurethane-base compound, or polyester-base compound.

Also, it is preferable that the bonding agent 9 of the inner bonding layer 6 have good bondability to both the rubber layer 2 and the metallic film 5 and be used together with the additive flame retardant 10 and that the bonding agent 9 of the outer bonding layer 8 have good bondability to both the metallic film 5 and the copolymer film 7 and be used together with the additive flame retardant 10.

As described above, the heat resistant cloth for fire fighting according to the present embodiment comprises the rubber layer 2, the inner bonding layer 6 containing a flame retardant, the polyester film 3 with the metallic (aluminum) films 4 and 5 deposited on opposite sides thereof, the outer bonding layer 8 containing the flame retardant, and the tetrafluoroethylene copolymer film 7 which are layered and bonded together on the outside of the substrate fabric 1. The cloth is preferably 0.3–1.5 mm thick.

The heat resistant cloth for fire fighting according to the embodiment as constructed above is almost as light as a conventional cloth even though the additive flame retardant 10 is added to the bonding layers 6 and 8. Furthermore, like a conventional cloth, it has high fire resistance, heat resistance, heat reflectivity, heat insulation, waterproofness, chemical resistance and impact resistance, light weight, good flexibility, excellent safety, good weather resistance, cold resistance, resistance to softening and abrasion resistance, high tensile strength and tearing strength, easy maintenance when tailored to firemen's clothing, a good texture, and resistance to soiling.

The inner and outer bonding layers 6 and 8, in which the flame retardant 10 powder of additive aluminum hydroxide or the like is added to the bonding agent 9 of resin-base such as a polyester-base, are used to bond the inner metallic film 5 of the polyester film 3 to the rubber layer 2 and to bond the tetrafluoroethylene copolymer film 7 to the outer metallic film 4 of the polyester film 3. Accordingly, the bonding layers 6 and 8 are less likely to suffer thermal deterioration or to burn even after long-hour use at high temperatures in contrast to conventional heat resistant cloth for fire fighting. Hence, bonded portions are prevented from separating, and the durability is improved. Moreover, thanks to heat resistance provided by the tetrafluoroethylene copolymer film 7 and the polyester film 3 and the reflection of heat provided by metallic (aluminum) films 4 and 5 deposited on opposite sides of the polyester film 3, the bonded portion between the substrate fabric 1 and the rubber layer 2 is hardly heated. Accordingly, all bonded portions of the heat resistant cloth for fire fighting according to the present embodiment are less likely to separate, thus improving the durability of the entire heat resistant cloth.

Moreover, when the bonding layers 6 and 8 burn, the flame retardant contained therein suppresses afterflame to within 2 seconds, afterglow to within 30 seconds, and the length of char to within 6 cm, thus improving safety.

Obviously, numerous modifications and variations of the present invention are possible in light of the above teachings. It is therefore to be understood that within the scope of the appended claims, the present invention may be practiced otherwise than as specifically described herein.

What is claimed is:

1. A heat resistant cloth for firefighting comprising in the following order: a fabric substrate, a first bonding layer containing a flame retardant, a polyester film layer having metal deposited on opposite sides thereof, a second bonding layer containing a flame retardant, and a tetrafluoroethylene copolymer film layer, said layers bonded together on an outer surface of the substrate fabric.

2. A heat resistant cloth for fire fighting according to claim 1, wherein each of said first and second bonding layers includes a resin-base bonding agent and a flame retardant which is mixed into the bonding agent in an amount of 5–20% by weight based on the total weight.

3. A heat resistant cloth for fire fighting according to claim 2, wherein said flame retardant comprises a powder of a material selected from the group consisting of aluminum hydroxide, antimony oxide, bromic compound, chromium compound, and phosphoric compound.

4. A heat resistant cloth for fire fighting according to claim 3, wherein said frame retardant comprises a powder of aluminum hydroxide.

5. A heat resistant cloth for fire fighting according to claim 2, wherein said metal deposited on opposite sides of said polyester film is aluminum.

\* \* \* \* \*